(12) United States Patent
Weber et al.

(10) Patent No.: US 7,540,790 B2
(45) Date of Patent: Jun. 2, 2009

(54) QUICK-FIXING DEVICE ON ELECTRICAL INSTALLATION EQUIPMENT

(75) Inventors: Ralf Weber, Heidelberg (DE); Steffen Weingärtner, Heidelberg (DE); Klaus-Peter Eppe, Waldbrunn (DE)

(73) Assignee: ABB Patent GmbH, Ladenburg (DE)

( * ) Notice: Subject to any disclaimer, the term of this patent is extended or adjusted under 35 U.S.C. 154(b) by 17 days.

(21) Appl. No.: 11/793,675

(22) PCT Filed: Dec. 15, 2005

(86) PCT No.: PCT/EP2005/013473

§ 371 (c)(1),
(2), (4) Date: Nov. 13, 2007

(87) PCT Pub. No.: WO2006/069634

PCT Pub. Date: Jul. 6, 2006

(65) Prior Publication Data

US 2008/0186657 A1     Aug. 7, 2008

(30) Foreign Application Priority Data

Dec. 24, 2004   (DE) .................. 10 2004 062 524
Aug. 17, 2005   (DE) .................. 10 2005 038 776

(51) Int. Cl.
*H01R 9/26* (2006.01)
(52) U.S. Cl. .................................................... 439/716
(58) Field of Classification Search ................. 439/716, 439/532, 709; 361/673
See application file for complete search history.

(56) References Cited

U.S. PATENT DOCUMENTS

| 4,067,529 | A | 1/1978 | Milcoy |
| 4,878,859 | A * | 11/1989 | Haller et al. ................ 439/716 |
| 4,900,275 | A | 2/1990 | Fasano |
| 6,224,429 | B1 | 5/2001 | Bernhards et al. |
| 6,293,820 | B1 | 9/2001 | Bechaz et al. |
| 6,840,819 | B2 * | 1/2005 | Bet et al. .................... 439/716 |

FOREIGN PATENT DOCUMENTS

DE      31 49 310 A1    6/1983

(Continued)

OTHER PUBLICATIONS

International Search Report dated Mar. 23, 2006.

(Continued)

*Primary Examiner*—Gary F. Paumen
(74) *Attorney, Agent, or Firm*—Buchanan Ingersoll & Rooney PC

(57) ABSTRACT

The invention relates to a quick-fixing device on electrical installation equipment, in particular, on a power breaker, residual current circuit breaker, or similar, for clipping the same to a standard profile rail in particular a top-hat rail, whereby the electrical installation equipment comprises a recess on the fixing side with a fixed lug arranged on a wall of the recess and a moving lug permanently pressed inwards against a spring force in the direction of a wall, said lug engaging in the assembled state behind the longitudinal edge of the free arm of the top-hat rail. The sprung lug is moulded to a bar, connected in one-piece to the installation equipment by at least one sprung connector web.

14 Claims, 7 Drawing Sheets

FOREIGN PATENT DOCUMENTS

Figure 1:
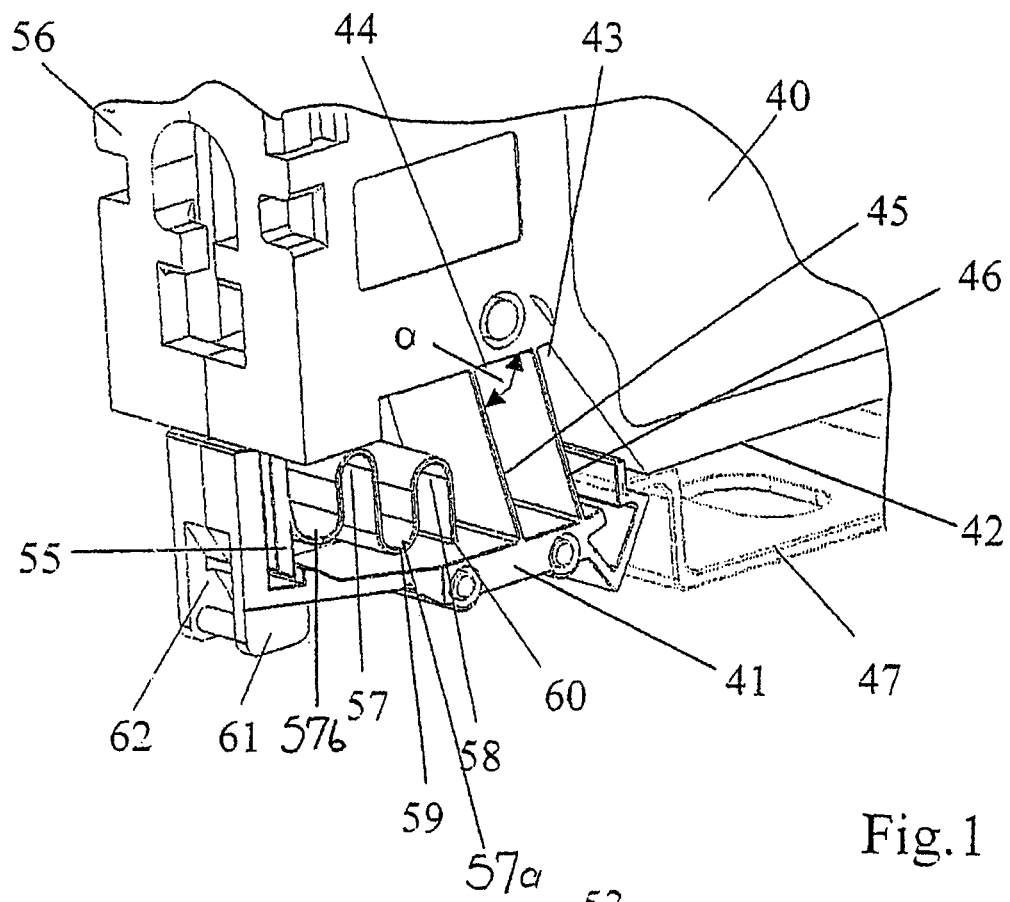

| | | |
|---|---|---|
| DE | 295 06 579 U1 | 8/1995 |
| DE | 198 36 890 A1 | 2/2000 |
| DE | 101 14 730 A1 | 10/2001 |
| DE | 103 40 207 A1 | 10/2004 |
| EP | 0 602 305 A1 | 6/1994 |
| GB | 2 205 997 A | 12/1988 |
| GB | 2 298 090 A | 8/1996 |

OTHER PUBLICATIONS

Germany Search Report dated Oct. 11, 2005.
Germany Search Report dated Mar. 24, 2006.

* cited by examiner

QUICK-FIXING DEVICE ON ELECTRICAL INSTALLATION EQUIPMENT

The invention relates to a quick-fixing device according to the pre-characterizing clause of claim 1 and claim 2.

Examples of electrical installation equipment are line-protection circuit breakers, residual current circuit breakers, or motor protection circuit breakers, a common feature of which is that, on their fixing side, they are designed so that they can be clipped onto standard profile mounting rails, in particular onto top-hat rails within an installation distribution board or in a low-voltage switchgear cabinet.

For simplification, only a line-protection circuit breaker will be considered as an example.

As well as front sides and narrow sides, this line-protection circuit breaker has a fixing side or fixing surface, in which a recess is made, the boundary walls of which run at right angles to the fixing side. One boundary wall is provided with a lug-like projection, which projects towards the opposite boundary wall, is molded on the line-protection circuit breaker, and forms a fixed latching lug.

A so-called moving lug, which is pressed inwards under spring force into the recess, i.e. in the direction of the opposite fixed lug, is arranged on the opposite boundary wall.

The top-hat rail is fitted horizontally in the installation distribution board, the free legs of the top-hat rail being arranged vertically. For fitting, the line-protection circuit breaker is therefore hung onto the top longitudinal edge with its fixed lug so that the fixed lug engages behind this edge. By swiveling the line-protection circuit breaker about the suspension point against the top-hat rail, the moving lug moves against the bottom edge of the top-hat rail and, when pushed in further, the moving lug engages behind this bottom edge.

In general, the moving lug is molded on a slider, which is guided so that it can slide on the fixing side, said slider being pressed inwards into the recess against a stop by means of a helical compression spring, for example. For removal, the slider is moved away from the top-hat rail by means of a tool, for example a screwdriver, so that the movable or moving lug comes free from the top-hat rail. By swiveling the line-protection circuit breaker in a direction opposite to the fitting movement, the line-protection circuit breaker can be removed from the top-hat rail.

A definite problem consists in that, when several line-protection circuit breakers are arranged next to one another in a row, so-called cross-wiring is required, which distributes the input voltage potential of the installation distribution board to the individual parallel line-protection circuit breakers. With single-pole line-protection circuit breakers, this cross-wiring can be formed by means of a flat strip busbar with appropriate connecting lugs or, in the case of multi-pole line-protection circuit breakers, by means of a bus bar arrangement, which has a number of flat strip conductors corresponding to the number of phases, on each of which connecting lugs are molded, which can be connected to the corresponding line-protection circuit breaker poles or clamped in their connecting terminals.

If one of the line-protection circuit breakers has to be replaced because of a defect, then with the line-protection circuit breakers normally used, the cross-wiring must first be removed and only then can the line-protection breaker be taken out.

Recently, slider arrangements have also become available, with which the sliding movement of the movable lug is sufficiently large that the line-protection circuit breaker can be slid parallel to the legs of the top-hat rail to such an extent that the fixed lug comes free from the top-hat rail. It is then no longer necessary to remove the cross-wiring.

The quick-fixing device normally consists of at least two parts, namely a slider and a compression spring, which presses the slider inwards against the top-hat rail. This means increased stockholding and also increased installation effort.

DE 101 147 30 A 1 shows an item of electrical installation equipment in which the latching lug is arranged on a slot element, said slot element being connected in one piece to the installation equipment. The one-piece connection between the slot element and the housing is made by means of a roughly elliptical spring element, which spans a plane, which is aligned parallel with the base surface or with the two free legs of the top-hat rail, which form a plane. In addition, DE 101 147 30 A1 is concerned with a monitoring relay, so that problems with cross-wiring when replacing a defective monitoring relay do not arise.

EP 0 602 305 A1 has disclosed a quick-fixing device of the kind mentioned in the introduction, in which a latching lug is molded on a slider arranged at right angles to the longitudinal extension of the top-hat rail; this slider is connected to the housing by means of a so-called bending web so that the slider can be swiveled about an axis, which runs parallel to the longitudinal extension of the top-hat rail and is formed by a reduction in the wall thickness. For this reason, the slider requires a special additional guide arrangement so that the slider can be pressed under spring force against the adjacent free longitudinal edge of the top-hat rail, and thereby move at right angles to the longitudinal extension of the top-hat rail.

The object of the invention is to create a quick-fixing device of the kind mentioned in the introduction, which avoids an additional guide for the slider, as a result of which the ability to manufacture the installation equipment with the slider is simplified. According to the invention this problem is solved by the characteristics of claim 1.

According to the invention, therefore, the sprung or movable lug is molded on a slider, which can be moved at right angles to the top-hat rail, said slider being connected in one piece to the installation equipment by at least one connector web, which serves to guide the slider.

With this embodiment according to the invention, the direction in which the installation equipment is fitted is determined by the provision of a fixed and a movable lug. In general, the installation equipment is hung in place with the fixed lug over the top vertical longitudinal edge of the top-hat rail and latched to the top-hat rail by swiveling downwards, whereby the movable lug clips behind the bottom longitudinal edge of the top-hat rail.

The object of the invention is therefore furthermore to create an electrical device with which the fitting direction is independent of the installed position of the device.

According to the invention this problem is solved by the characteristics of claim 2.

According to the invention, therefore, two sprung lugs are provided, which press inwards and which are each molded on a slider, which can be moved at right angles to the top-hat rail, said sliders being connected in one piece to the installation equipment by at least one sprung connector web, which serves to guide the sliders.

In a particularly advantageous manner, two connector webs, which run parallel to one another, can be provided, as a result of which the guiding of the slider at right angles to the longitudinal extension of the top-hat rail and parallel to the fixing plane of the installation equipment is assured.

According to a further advantageous embodiment of the invention, each connector web is formed as a planar connector web, whereby the connector web or webs run(s) with their surface(s) parallel to the longitudinal extension of the top-hat rail. By this means it is possible to make the connection between the installation equipment and the slider so that a mold with a so-called cross-slide is not necessary. In particular, it is possible to remove the housing of the installation equipment from the mold without additional movement of a cross-slide of this kind, which simplifies the manufacture of such an item of installation equipment overall.

Furthermore, a spring arrangement, which presses the slider against the mounting rail and which is likewise connected in one piece to the installation equipment and to the slider, can be provided between the installation equipment and the slider, this spring being arranged so that here too a removal of the housing of the installation equipment from the mold is made possible without additional movement of a so-called cross-slide.

Of course, it is possible that the connector webs themselves also allow the sprung movement of the slider on their own and without the spring arrangement.

In a practical manner, the connector web or the two connector webs can be connected to the slider while forming an open obtuse angle with the top-hat rail and to the installation equipment while forming a complementary acute angle, whereby the two angles add up to 180°.

According to a further embodiment of the invention, two sawtooth-shaped latching lugs can be provided on the surface of the slider pointing towards the installation equipment, of which one is positioned nearer to the moving lug and a second nearer to the opposite end, whereby the vertical boundary of the first lug points towards the moving lug and the vertical boundary of the second lug points towards the end of the slider.

A further embodiment of the invention can provide for protruding sprung arms to be provided on the installation equipment perpendicular to the slider, against which, depending on the position of the slider, the vertical boundaries of one or other latching lug lie in such a way that, after withdrawing the slider from the installation equipment, the one protruding sprung arm lies against the vertical boundary of the first lug so that the slider is prevented from being pushed in towards the top-hat rail, and that in the pressed-in position of the slider, the arm engages behind the second lug so that the slider is prevented from being pulled out.

Further advantageous embodiments and improvements of the invention can be seen in the further dependent claims.

The invention as well as further advantageous embodiments and improvements and further advantages of the invention are explained and described in more detail with reference to the drawing, in which two exemplary embodiments of the invention are shown.

Figure 3:
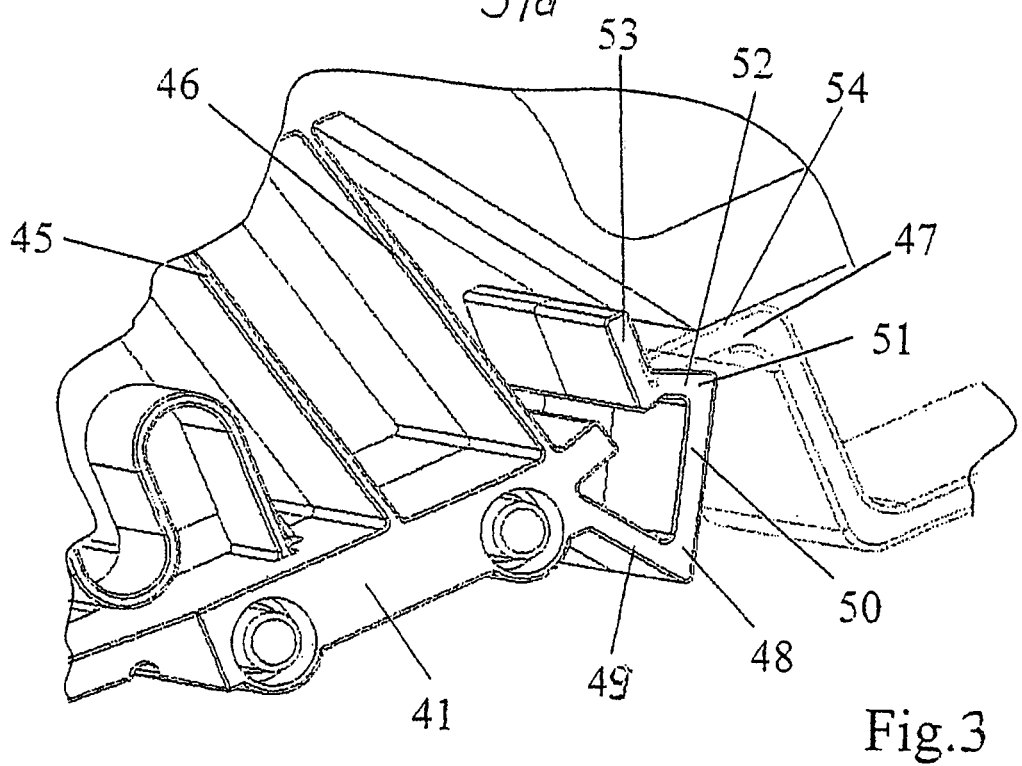
Figure 2:
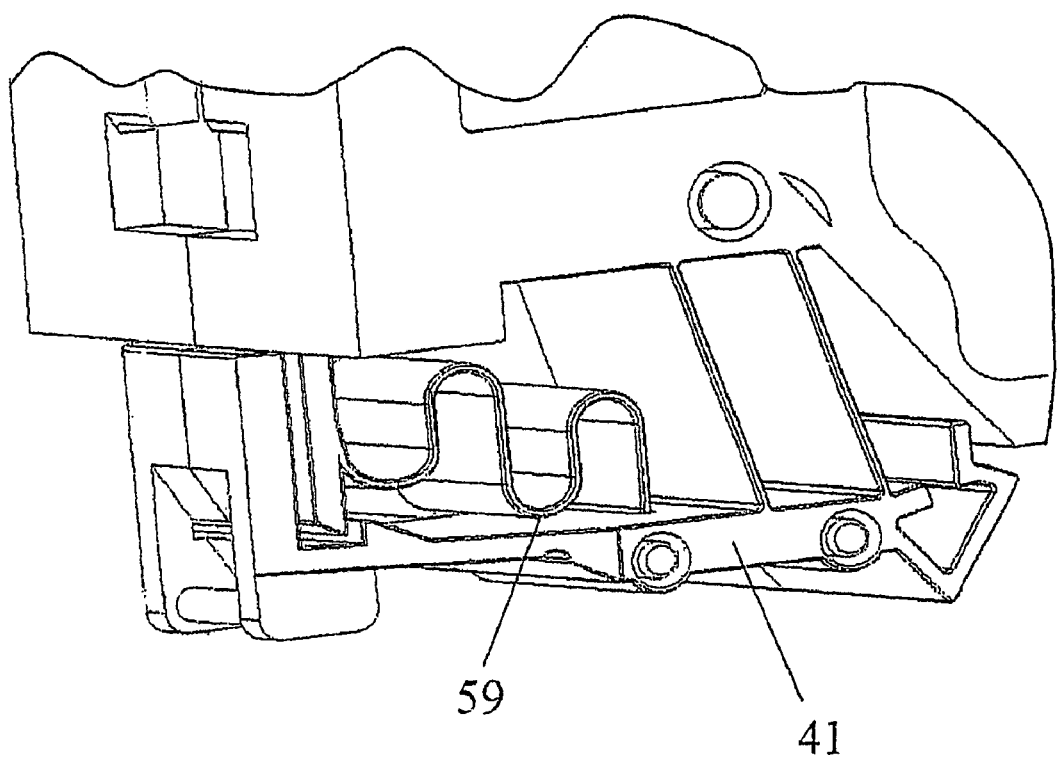
Figure 4:
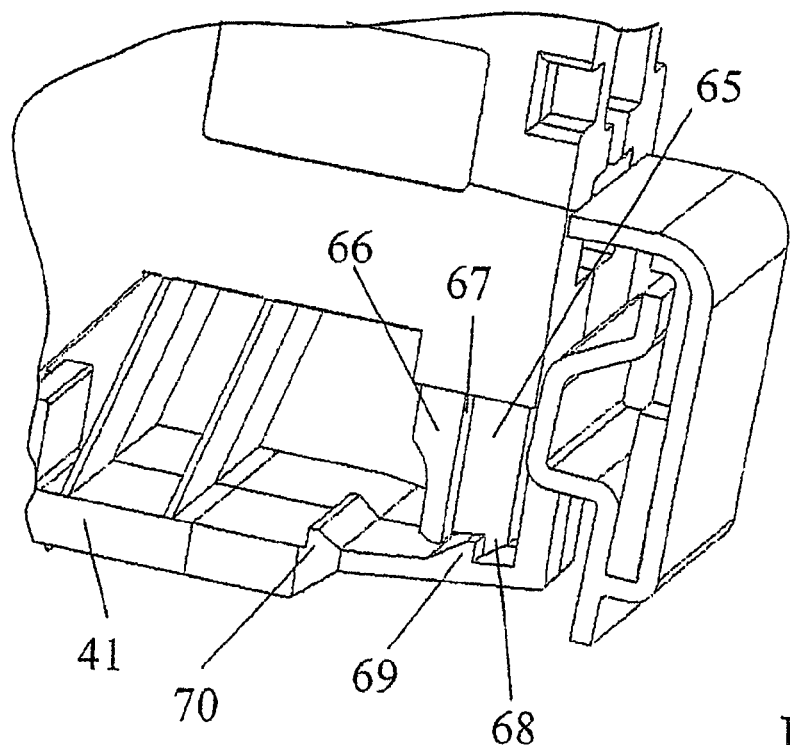
Figure 5:
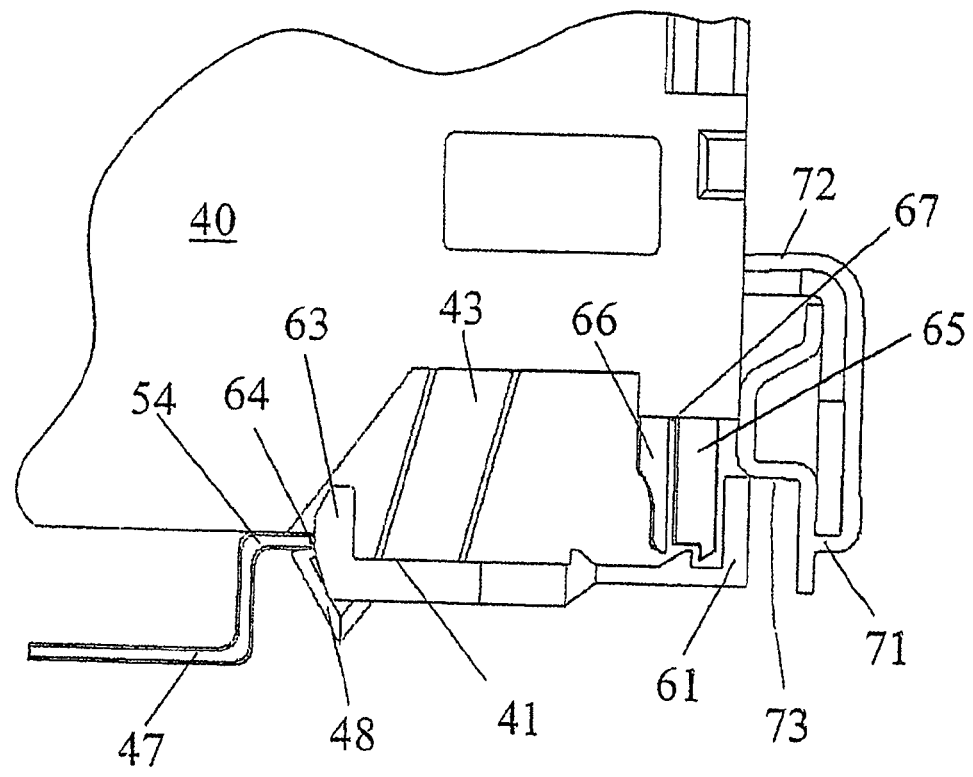
Figure 9:
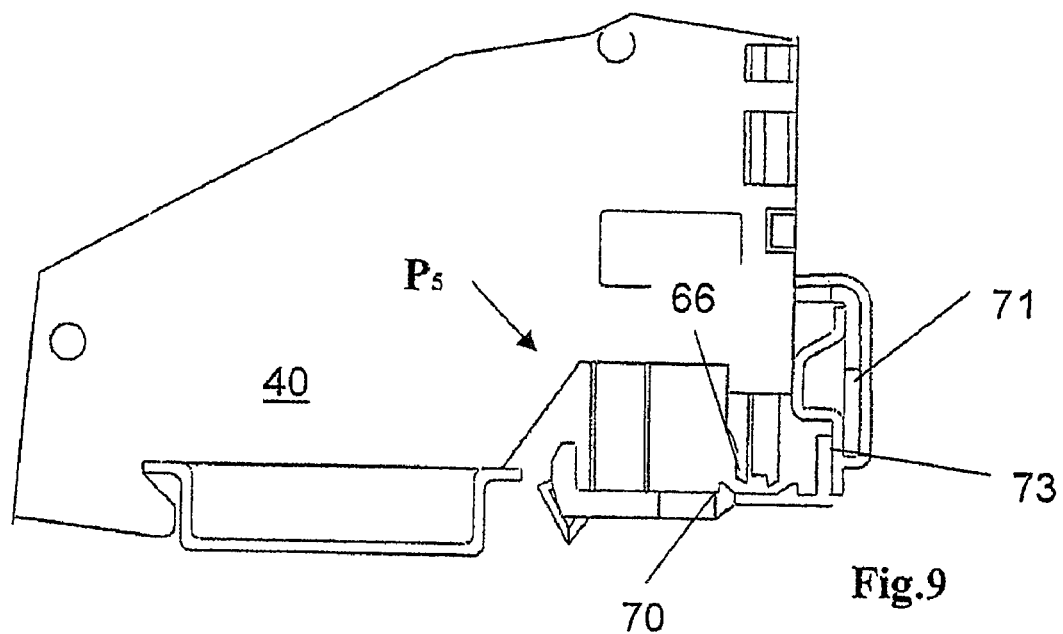
Figure 10:
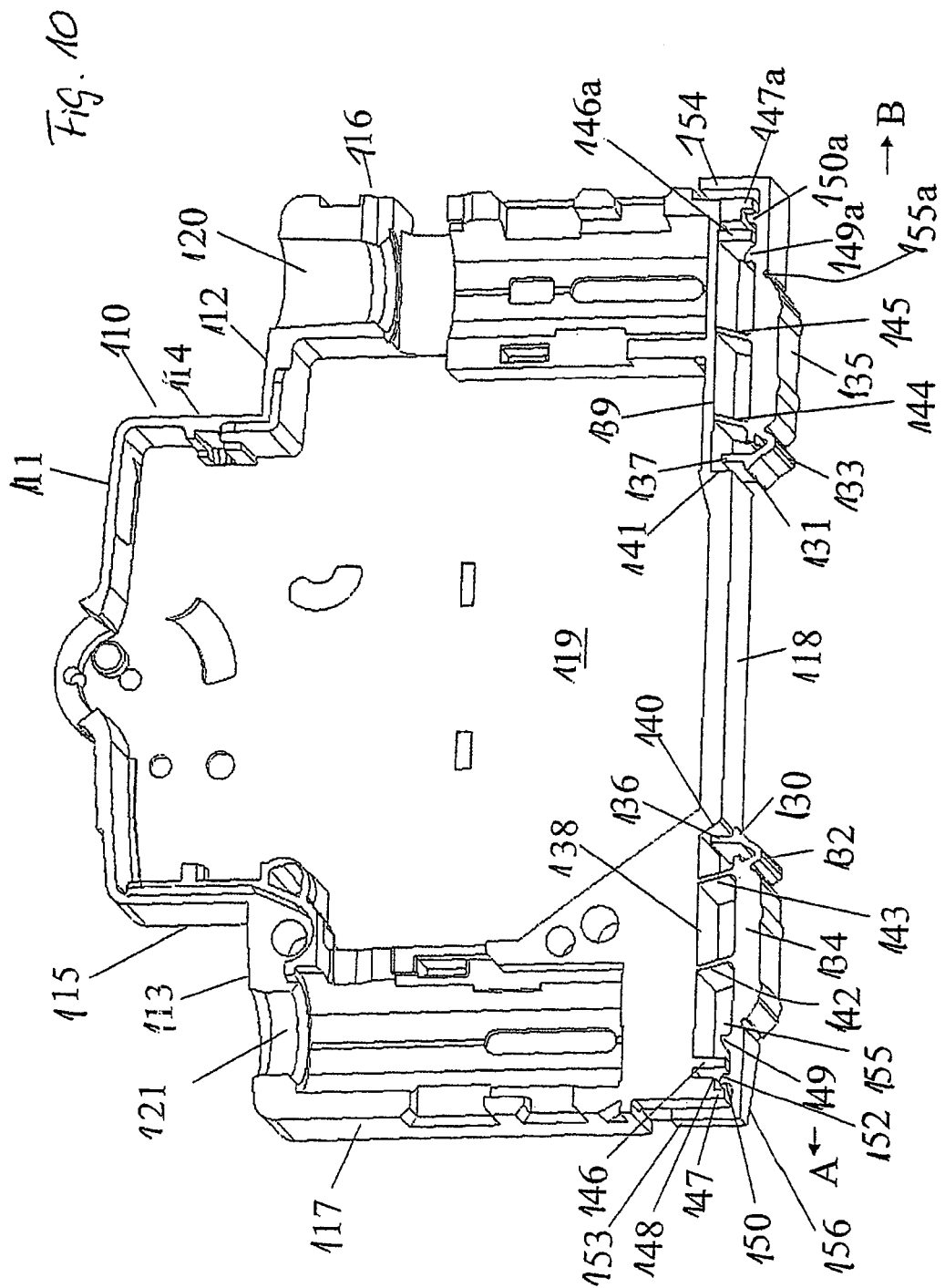
Figure 11:
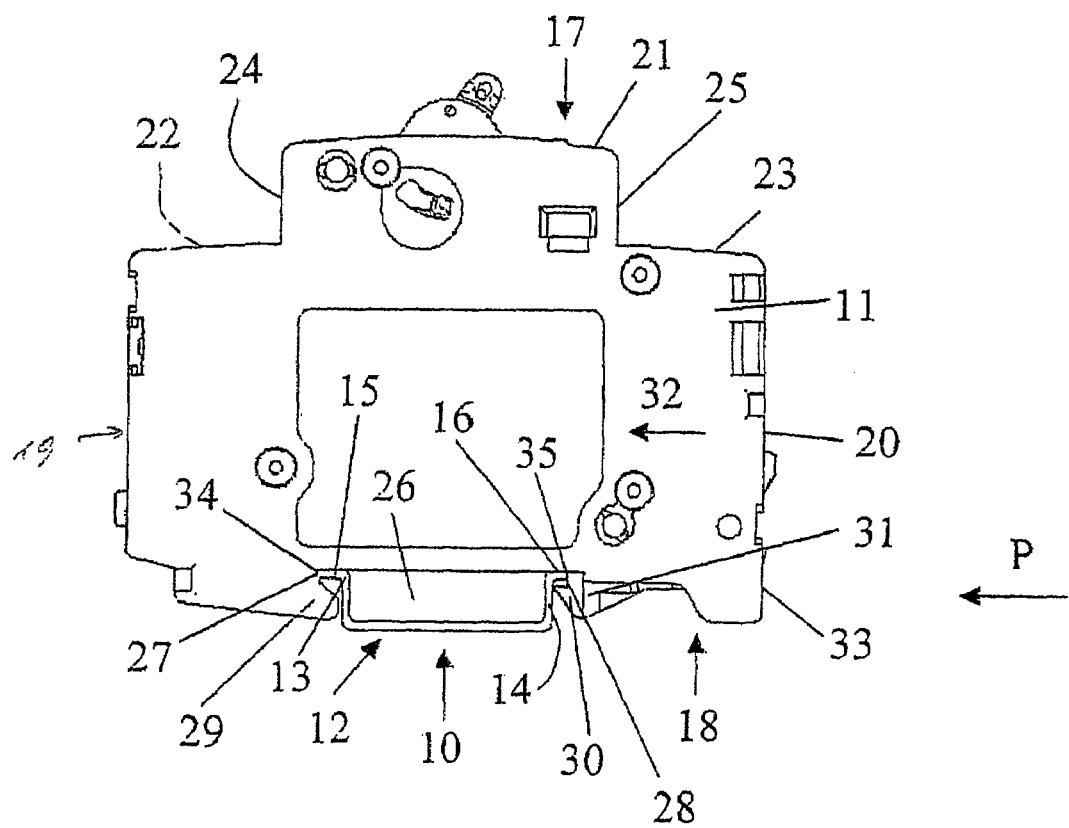

In the drawing:

FIG. 1 shows a perspective view of a quick-fixing device on an item of installation equipment, FIG. 2 shows the quick-fixing device in a different perspective, FIG. 3 shows a partial view of the slider, likewise in perspective view, FIG. 4 shows a further partial section of the slider, FIG. 5 shows a side view of the slider together with a top-hat rail, FIGS. 6 to 9 show a quick-fixing device in different positions during removal, FIG. 10 shows a view of a further embodiment of the invention, and FIG. 11 shows a side view of a line-protection circuit breaker, which is clipped to a top-hat rail according to the state of the art.

Reference is now made to FIG. 11, which shows the state of the art that generally prevails at the present time.

A line-protection circuit breaker 11 is clipped onto a top-hat rail 10, which is drawn here in cross-section.

The top-hat rail 10 has a U-shaped section 12, which runs longitudinally, a flange or strip 15 and 16, each protruding in opposite directions, being bent over at the ends of the legs 13 and 14; the two strips 15 and 16 lie in one plane, which is aligned vertically in the fitted state when the top-hat rail 10 is mounted in an installation distribution board.

The line-protection circuit breaker 11 has a front side 17 and a fixing side 18, the front side 17 and the fixing side 18 running roughly parallel with one another. Furthermore, the line-protection circuit breaker 11 has narrow side walls 19 and 20, which run at right angles to the fixing side 18. That the line-protection circuit breaker in FIG. 10 has a forward front wall section 21 and two rear front wall sections 22 and 23, which are connected by front narrow side walls 24 and 25, which run roughly at right angles to the fixing plane or fixing side 18, is not of importance here for the invention.

On its fixing side, the line-protection circuit breaker 11 has a recess 26, which is bounded by boundary walls 27 and 28. On the one boundary wall 27 is a fixed lug 29, which is molded on this, and a moving lug 30, which is molded on a slider 31 shown dotted, and which projects into the recess 26. The two lugs 29 and 30 lie opposite one another and are arranged to project towards one another.

Not shown is an additional spring associated with the slider 31, which presses the slider under spring force in the direction of the arrow 32, and which is usually designed as a helical spring.

One end of the slider (hidden), in which a slot, which is not shown in more detail, is made, into which a tool can be inserted so that the slider can be moved in the opposite direction to the arrow 32, is located in the area of the narrow side wall 20.

End edges 34 and 35, which, in the fitted state, engage behind the lugs 29 and 30, are provided on the strips 15 and 16.

For fitting, the line-protection circuit breaker 11 is hung with the lug 29 behind the edge 34 so that the lug 29 engages behind the edge 34 or the strip 15 or the flange 15. The line-protection circuit breaker 11 is then swiveled about this rear engagement point in a clockwise direction so that the moving lug 30 comes to rest against the edge 35 of the flange 16; when swiveled further in the clockwise direction, the edge 35 presses the lug 30 out of the way against the spring force in the direction of the arrow 32; when the lug 30 has passed the edge 35, the lug 30 clips behind the edge 35 or the flange 16. For removal, the slider 31 is pulled free from the edge 35 against the force 32 by means of a tool so that the line-protection circuit breaker 11 can be removed by rotating about the edge 34 in an anticlockwise direction.

Reference is now made to FIG. 1.

FIG. 1 is a perspective view of a line-protection circuit breaker 40 with a slider 41 according to the invention viewed in the direction of the arrow P of FIG. 11 in the area of the moving lug.

Only part of the line-protection circuit breaker is shown; in particular slider walls are omitted, which obscure the slider 41 in the fitted state.

On the fixing side 42, which corresponds to the fixing side 18, is a return 43, in which a slider 41 corresponding to the slider 31 is accommodated. The return 43 has a base surface 44 on which sprung connector webs 45 and 46 are molded, which are arranged at an angle to the base surface 44, an angle α, which is open to the top-hat rail 47, being formed between the connector webs 45 and 46 respectively and the base surface 44. The slider 41 is molded on the free ends of the connector webs 45 and 46. The connector webs 45 and 46 provide parallel guidance for the slider 41.

On the end of the slider 41 facing the top-hat rail 47, which can be partially seen in FIG. 3, a V-shaped section 48 is molded, one leg 49 of which connects to the slider 41, namely in the vicinity of the attachment point of the connector web 46, which is closer to the top-hat rail 47. Connected to the leg 49 is a further, free leg 50, which is angled towards the top-hat rail and forms an obtuse angle with this, and the free end of which constitutes a lug 51, which corresponds to the lug 30. Connected to the free leg 50 is a short section of leg 52, which is bent back towards the slider 41 and connects to an L-shaped section 53, the free end of which is arranged roughly at right angles to the top-hat rail or to the flange 54 of the top-hat rail 47. The open side of the V-shape points to the base surface 44.

On the side wall 56, which corresponds to the side wall 20, the recess 43 is bounded by a wall section 55 that protrudes parallel to the side wall 56 in a direction which is aligned opposite to the front wall. Connected to the wall section 55 with two U-shaped waves 57 and 58 is a spring 59, the other free end 60 of which is connected to the slider 41. This spring 59 actuates the slider in the direction of arrow $P_1$, which corresponds to the direction of arrow 32. The two U-shaped waves 57, 58 are open in the direction in which the wall section 55 protrudes. Between the two U-shaped waves is a U-shape 57a, which is open in the opposite direction, i.e. to the front wall, and a connector web 57b, which is likewise arranged in a U-shape and the open side of which likewise points to the front wall, is connected to the wall section 55; the connector web 57b therefore merges tangentially into the wall section 55 in the direction of the front wall. The free end 60 of the spring 59 protrudes in the direction in which the wall section 55 protrudes.

Outside the wall section 55 is a continuation 61, which is molded on the slider 41 on the free side of this opposite to the line-protection circuit breaker 40 and which protrudes at right angles to this free surface of the slider 41, whereby, together with the slider 41 and the projection 61, an opening 62 is formed in which a tool, for example a screwdriver, can be inserted if required, with which the slider 41 can be removed from the top-hat rail in the opposite direction to the arrow $P_1$.

FIG. 2 shows the slider 41 in a different perspective, namely to clarify the connection of the spring 59.

From the view according to FIGS. 3 and 5, it can be seen that the V-shaped section 48 only obscures part, in this case half, of the slider 41—measured at right angles to the longitudinal extension; in the area of the other half, at right angles to the slider and protruding into the recess 43, a bend 63 is molded, which in the fitted state, as shown in FIG. 5, is pressed against the free edge 64 of the flange 54 of the top-hat rail 47. As a result of this, the V-shaped section with its lug 51 can engage behind the flange 54 and, because of the bend 63, the slider 41 cannot be pushed in further, i.e. in the direction of the top-hat rail 47.

Figure 6:
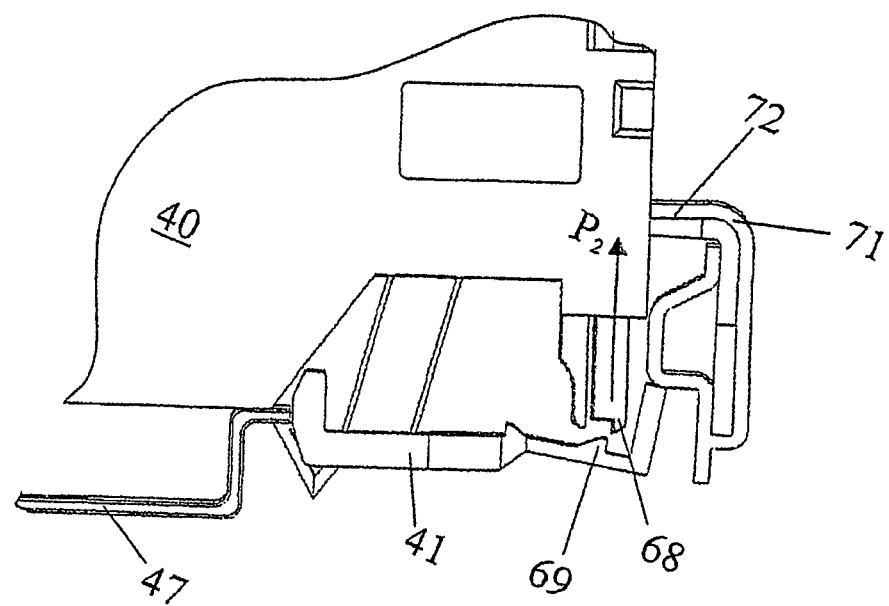
Figure 7:
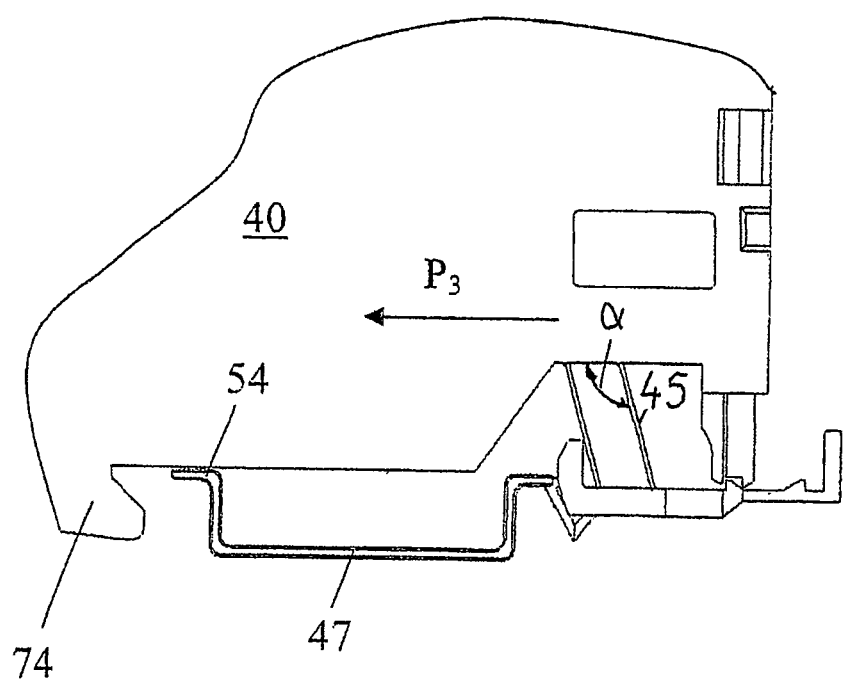
Figure 8:
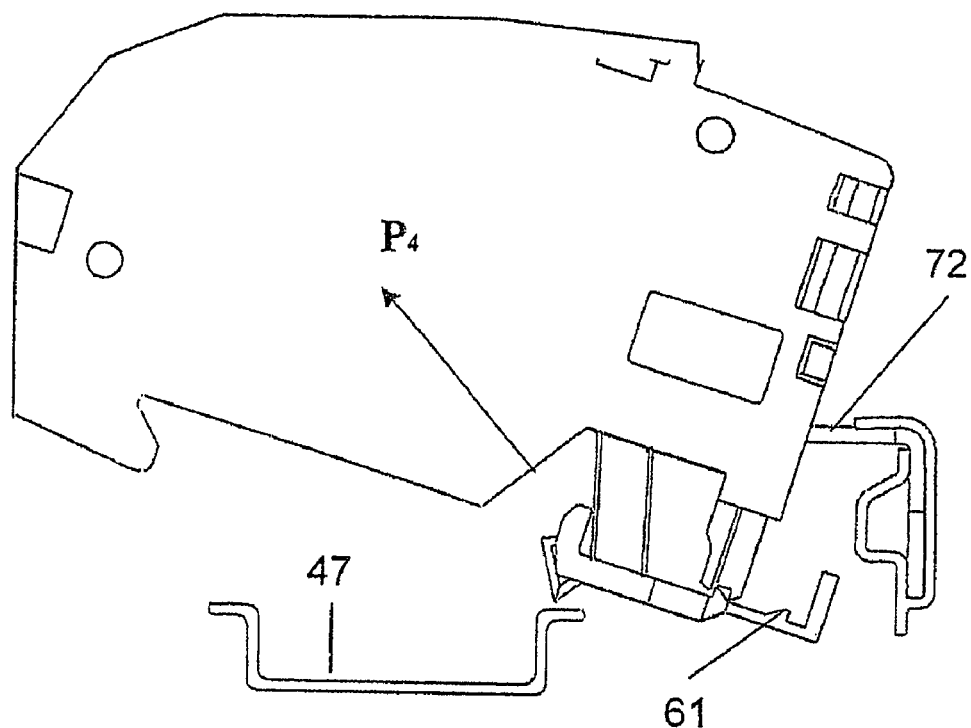

It can also be seen from FIGS. 4 to 6 that the wall section 55 is formed in two parts, a slot 67 being formed between an outer section 65 and a section 66 facing the top-hat rail 47. The free end of the outer section has a latching lug 68 (FIG. 6), which acts together with a counter latching lug 69, which protrudes from the slider 41 on the side facing the line-protection circuit breaker, in such a way that the counter latching lug 69 lies against the latching lug 68 so that, as a result, the slider is also prevented from sliding out in the opposite direction to the arrow $P_1$.

Parallel to the counter latching lug 69, the slider has a second latching lug 70—likewise on its side facing the line-protection circuit breaker. The two latching lugs 69, 70 are designed as sawtooth latching lugs whereby the two steep side walls of the latching lugs 69, 70 point in opposite directions and in doing so run at right angles to the slider surface, while the angled surfaces of the latching lugs 69 and 70 lie opposite one another.

Acting together with the line-protection circuit breaker 40 is a busbar arrangement 71, which has connecting lugs 72, which can be brought into contact with connecting terminals inside the line-protection circuit breaker 40. A shoulder 73, which is positioned roughly in the area of the free end of the bend 61 on the slider, is molded on this busbar arrangement 71.

In order to be able to remove the line-protection circuit breaker 40 from the top-hat rail 47 without first having to dismantle the busbar arrangement 71, the line-protection circuit breaker 40 is raised in the direction of the arrow $P_2$ in the area in which the slider 41 is located so that the projection 68 comes free from the latching lug 69. As a result, the line-protection circuit breaker 40 can be moved in the direction of the arrow $P_3$ until, firstly, the line-protection circuit breaker 40 comes free from the connecting lugs 72 and, secondly, the other flange 54a of the top-hat rail 47 comes free from the fixed lug 74, which corresponds to the fixed lug 29 of the arrangement according to FIG. 1. In doing so, the connector webs flip over so that the angle α of the connecting web 45 with the surface 44 changes to an obtuse angle. In this case, the free end of the section 66 engages behind the second latching lug 70. The line-protection circuit breaker can be lifted out by rotating it in a clockwise direction about the moving lug, this position being illustrated in FIG. 8, which shows how the line-protection circuit breaker with the slider molded thereon can be withdrawn from the area of the opening between the top-hat rail 47 and the connecting lugs 72, namely here in the direction of the angled arrow $P_4$.

Reference is made to FIG. 9 for fitting in the reverse direction. The line-protection circuit breaker 40 with its slider is fed in at an angle through the opening between the top-hat rail 47 and the connecting lugs 42 in the opposite direction to the arrow $P_4$ in the direction of the arrow $P_5$ until the bend 61 comes into contact with the busbar arrangement 71. Because of the shoulder 73, the slider 41 is swiveled so that the second latching lug 70 comes free from the free end of the section 66; the slider 41 then swivels inwards as a result of the spring action of the connector webs 45, 46 until the section 65 with the latching lug 68 moves behind the first latching lug 69 so that the slider is retained in its final position.

The housing bottom section 110 shown in FIG. 10, which is a half-shell-shaped housing bottom section, has a forward front surface 111 and two rear front surfaces 112, 113 at a distance therefrom as well as two front side walls 114, 115, which are arranged roughly at right angles to the forward front surface 111 and the rear front surfaces 112, 113 and join the two together. Connected to the rear front surfaces 112 and 113 are rear side surfaces 116 and 117, which merge into a fixing side 118, which is aligned roughly parallel with the forward front surface and the rear front surfaces 111, 112, 113 and at right angles to the front side surfaces 114, 115 and the rear side surfaces 116, 117. In this respect the line-protection circuit breaker uses the so-called foot design. The housing bottom section 110 has a housing wide side 119 so that a shell shape is formed together with the wide side or wide side wall 119 and the front and rear front and side walls and also with the fixing wall on the fixing side 118. It should be mentioned as a purely supplementary matter that recesses 120, 121 for connecting terminals are provided in the area of the rear front and side walls 116, 117.

The invention is now concerned with the design of the fixing surface at 118. Here, two movable lugs 130 and 131 are provided, which are connected to a slider 134, 135 by means of a V-shape 132, 133, the open side of which faces the fixing surface 118.

The longitudinal extensions of the sliders 134, 135 run parallel to the base or fixing wall 118, and the V-shapes 132, 133 connect to their inner ends, i.e. to their opposite ends, the length of the free legs 136, 137 on which the lugs 130, 131 are molded being longer than the thickness of the sliders 134, 135, measured at right angles to the fixing plane or wall 118. Returns 138 and 139 are provided on both sides in the fixing wall 118, on the fixing side, i.e. outside the housing 110, which are bounded on the inside, i.e. towards the middle of the fixing side or wall 118, by a closing wall 140, 141, whereby the closing wall 140 forms an acute angle with the fixing wall 18 or includes an obtuse angle with this, which is open to the inside of the housing.

The sliders 134 and 135 are fixed in the returns 138 and 139 by means of two webs 142, 143; 144, 145, which, in the position shown in FIG. 10, in each case form an acute angle α with the inner surface of the returns 138, which is open to the respective lug 130 or 131. The thickness of the webs 142, 143; 144,145 is such that the sliders 134, 135 can be moved from the position shown to a position in which the angles α are obtuse. This enables the sliders 134, 135 to be pushed outwards in the direction of arrows A and B respectively, as a result of which the webs 142, 143; 144, 145 deflect.

Bars 146, 147, which run at right angles to the recesses 138, 139 in the area of the rear walls 117, 116, are molded in the recesses, and form an intermediate space 148 between one another. The same bars can also be found on the other side. On the side facing the recess 138, the slider has latching lugs 149 and 150, which have a sawtooth shape, whereby in the case of the latching lug 149 located nearer to the lug 130, the angled surface 151 is located on the side opposite the lug 130, and the angled surface 152 on the latching lug 150 is located towards the lug 130. In the position shown in FIG. 10, the outer lug 150 engages in the intermediate space 148, and the inner lug 149 or inner latching lug 149 is positioned on the side of the bar 146, which faces the lug 130.

If a force is exerted on the slider 134, for example in the direction of arrow A, then the latching lug 150 moves against the bar 147 so that the movement of the slider in the direction of arrow A is limited. At the end outside the rear side wall, each slider 134, 135 has a protruding web 153, 154 at right angles to it. Between the lug 149 and the lug 130 there is a constriction 155 near the lug 149 so that the area 156 on which the lug 153 is molded can be swiveled about the constriction 155. If the circuit breaker is to be removed, the web 153 is swiveled in an anticlockwise direction about the constriction by means of a screwdriver; in this way, the latching lug 152 comes free from the bar 147 so that the slider can be pushed further in the direction of arrow A, i.e. to the point where the latching lug 150 lies against the bar 147. So that the line-protection circuit breaker can also be removed from the combination when the connecting terminals of several line-protection circuit breakers are mechanically and electrically coupled by means of a busbar, the area 156 can be moved further in the direction of arrow A by further deflection about the constriction 155, whereby the latching lug 149 can slide behind the bar 146 due to the angled surface 151.

The same is also to be found on slider 135. Here, the bar 146a and the bar 147a as well as the latching lugs 149a and 150a can be seen.

The webs 142, 143; 144, 145, which are arranged parallel to one another, also remain parallel when the sliders 134, 135 are moved from the position shown in FIG. 10 in the direction of arrow A or B respectively. The webs 142, 143; 144, 145 with the sliders 134, 135 snap over in a definite manner out of the position shown in the Figure into the position in which the sliders or the lugs 130, 131 are away from the free longitudinal edges of the top-hat rail. The invention has been explained with reference to a line-protection circuit breaker; it can of course be used on any installation equipment, which is intended to be latched onto a top-hat rail.

The invention claimed is:

1. A quick-fixing device on electrical installation equipment, in particular on a line-protection circuit breaker, residual current circuit breaker, or similar, for clipping the same to a standard profile rail, in particular a top-hat rail, whereby the electrical installation equipment has a recess on the fixing side with a fixed lug arranged on a first wall of the recess and a moving lug arranged on the second wall permanently pressed inwards under a spring force in the direction of the first wall, said lugs engaging in the assembled state behind the longitudinal edges of the free leg of the top-hat rail, wherein the sprung lug is molded on a slider, which can be moved at right angles to the top-hat rail, said slider being connected in one piece to the installation equipment by at least one sprung connector web, which serves to guide the slider.

2. The quick-fixing device as claimed in claim 1, wherein two sprung connector webs, which run parallel to one another, are provided on each slider.

3. The quick-fixing device as claimed in claim 2, wherein each connector web is formed as a planar connector web.

4. The quick-fixing device as claimed in claim 1, wherein a spring arrangement, which presses the slider against the mounting rail and which is connected in one piece to the installation equipment and to the slider, is provided between the installation equipment and the slider.

5. The quick-fixing device as claimed in claim 1, wherein in the fitted position, the at least one connector web is connected to the slider while forming an open obtuse angle with the top-hat rail and to the installation equipment while forming a complementary acute angle (d), whereby the two angles add up to 180°, and, in the unlatched position, is connected to the slider while forming an acute angle with the top-hat rail and to the installation equipment while forming a complementary acute angle α.

6. The electrical device as claimed in claim 1, wherein two sprung strips, which act together with the latching lugs molded on the sliders, are molded on the fixing surface in the area of the rear side surfaces at right angles to the fixing surface.

7. The quick-fixing device as claimed in claim 6, wherein two sawtooth-shaped latching lugs are provided on the surface of the slider pointing towards the installation equipment, of which one is positioned nearer to the moving lug and a second nearer to the opposite end, whereby the vertical boundary of the first lug points towards the moving lug and the vertical boundary of the second lug points towards the end of the slider.

8. The quick-fixing device as claimed in claim 1, wherein protruding sprung arms are provided on the installation equipment perpendicular to the slider, against which, depending on the position of the slider, the vertical boundaries of one or other latching lug lie in such a way that, after withdrawing the slider from the installation equipment, the one protruding sprung arm lies against the vertical boundary of the first lug so that the slider is prevented from being pushed in towards the top-hat rail, and that in the pressed-in position of the slider, the arm engages behind the second lug so that the slider is prevented from being pulled out.

9. The electrical device as claimed in claim 1, wherein a constriction, about which the end of each slider can be swiveled for removal, is provided between the movable lug and the outward-protruding end of each slider.

10. The quick-fixing device as claimed in claim 2, wherein a spring arrangement, which presses the slider against the mounting rail and which is connected in one piece to the installation equipment and to the slider, is provided between the installation equipment and the slider.

11. The quick-fixing device as claimed in claim 3, wherein a spring arrangement, which presses the slider against the mounting rail and which is connected in one piece to the installation equipment and to the slider, is provided between the installation equipment and the slider.

12. A quick-fixing device on electrical installation equipment, in particular on a line-protection circuit breaker, residual current circuit breaker, or similar, for clipping the same to a standard profile rail, in particular a top-hat rail, whereby the electrical installation equipment has a recess-like section on the fixing side with at least one moving lug arranged on the fixing surface which, in the state where it is clipped onto the top-hat rail, engages behind one of the longitudinal edges of the top-hat rail, wherein two mutually opposing sprung lugs are provided on the fixing surface, one each of said lugs being molded on a slider, which can be moved at right angles to the top-hat rail, said sliders being connected in one piece to the installation equipment in each case by at least one sprung connector web, which serves to guide the sliders.

13. The quick-fixing device as claimed in claim 12, wherein two sprung connector webs, which run parallel to one another, are provided on each slider.

14. The quick-fixing device as claimed in claim 12, wherein a spring arrangement, which presses the slider against the mounting rail and which is connected in one piece to the installation equipment and to the slider, is provided between the installation equipment and the slider.

* * * * *